(12) United States Patent
Loganathan

(10) Patent No.: US 9,396,098 B2
(45) Date of Patent: Jul. 19, 2016

(54) APPARATUSES, METHODS, AND COMPUTER PROGRAM PRODUCTS FOR CONDUCTING AUTOMATED TESTS

(71) Applicant: McKesson Financial Holdings, Hamilton (BM)

(72) Inventor: Balaji Loganathan, Alpharetta, GA (US)

(73) Assignee: McKesson Financial Holdings, Hamilton (BM)

( * ) Notice: Subject to any disclaimer, the term of this patent is extended or adjusted under 35 U.S.C. 154(b) by 134 days.

(21) Appl. No.: 14/226,247

(22) Filed: Mar. 26, 2014

(65) Prior Publication Data

US 2015/0278075 A1     Oct. 1, 2015

(51) Int. Cl.
*G06F 11/00* (2006.01)
*G06F 11/36* (2006.01)

(52) U.S. Cl.
CPC ........ *G06F 11/3684* (2013.01); *G06F 11/3688* (2013.01)

(58) Field of Classification Search
USPC ..................................... 714/25, 46
See application file for complete search history.

(56) References Cited

U.S. PATENT DOCUMENTS

| 2003/0070119 | A1* | 4/2003 | Dallin | G06F 11/3684 714/38.14 |
| 2013/0100831 | A1* | 4/2013 | Brandt | H04B 3/542 370/252 |
| 2013/0219227 | A1* | 8/2013 | Augustine | G06F 11/3688 714/38.1 |
| 2015/0100831 | A1* | 4/2015 | Nanjundappa | G06F 11/3688 714/38.1 |

* cited by examiner

*Primary Examiner* — Sarai Butler
(74) *Attorney, Agent, or Firm* — Alston & Bird LLP

(57) ABSTRACT

Apparatuses, methods, and computer program products are provided that conduct an automated test by creating automated testing scripts that are readable by automated testing software without requiring the automated testing scripts to be created by a programmer with knowledge of the particular scripting language used by the automated testing software. Rather, a test case template is generated by receiving input from the user in the form of keywords and selections that are not specified in a particular scripting language. Instructions for converting the test case template into a readable format are accessed by the automated testing software, such that the automated testing software can read the test case template as though it were created in the corresponding scripting language of the automated testing software, thereby allowing the automated testing software to execute the automated test.

20 Claims, 14 Drawing Sheets

| Step | ObjectClass | ObjectName | Action | Testdata | If Failure |
|---|---|---|---|---|---|
| 1 | Common | | Login | | Continue |
| 2 | Browser Page | McKesson Patient Folder_McKesson Pati | SetParent | | Continue |
| 3 | WebElement | btnADMIN | Click | | Continue |
| 4 | WebTable | tblAdmin Tree View | ClickcellText | Fax Numbers | Continue |
| 5 | Browser Page | McKesson Patient Folder_Fax Numbers | SetParent | | Continue |
| 6 | WebElement | titFax Numbers | Exist | TRUE | Abort |
| 7 | WebTable | tblFax Numbers | Rowcount | | Continue |
| 8 | WebElement | btnAdd | Click | | Continue |
| 9 | WebElement | btnSave | Disabled | TRUE | Continue |
| 10 | Common | | DBValidation | select max(faxes_seq)+1 from cabinet..FAXES | Continue |
| 11 | Common | | Strext | Testing_Row$10 | Abort |
| 12 | WebEdit | edtrecipient | Set | Row$11 | Continue |
| 13 | WebEdit | edtFaxNumber | Set | 123-112-2121 | Continue |
| 14 | WebElement | btnSave | EnabIed | TRUE | Continue |
| 15 | WebElement | btnSave | Click | | Continue |
| 16 | WebTable | tblFax Numbers | Validaterowcount | Row$7,1 | Continue |
| 17 | Common | | Logoff | | Continue |

FIG. 6

| Object Class | Browser_Page | Common | WebButton | WebCheckbox | WebCombo | WebEdit |
|---|---|---|---|---|---|---|
| Browser_Page | SetParent | | | | | |
| Common | | DBValidation | Click | Click | Click | Click |
| WebButton | | Endloop | Disabled | Disabled | Disabled | Disabled |
| WebCheckbox | | Login | Enabled | Enabled | Enabled | Enabled |
| WebCombo | | Logoff | Exist | Exist | Exist | Exist |
| WebEdit | | Run | | | | Getproperty |
| WebElement | | SendKey | | | | Set |
| WebImage | | Startloop | | | | Verifytext |
| WebLabel | | Strcat | | | | Wait_Exist |
| WebLink | | Strcmp | | | | |
| WebList | | Wait | | | | |
| WebMenu | | | | | | |
| WebRadio | | | | | | |
| WebTable | | | | | | |

FIG. 8A

| WebElement | WebImage | WebLabel | WebLink | WebList | WebMenu | WebRadio | WebTable |
|---|---|---|---|---|---|---|---|
| Click | Click | Click | Click | Click | Click | Click | Clickcelltext |
| Clicktext | Disabled | Disabled | Disabled | Disabled | Disabled | Disabled | Dblclickcelltext |
| Disabled | Enabled | Enabled | Enabled | Enabled | Enabled | Enabled | Disabled |
| Enabled | Exist | Exist | Exist | Exist | Exist | Exist | Enabled |
| Exist | | Getproperty | | | | | Exist |
| Fireevent | | | | | | | Rowcount |
| Getproperty | | | | | | | Selectrow |
| Validatenotificationmsg | | | | | | | Textcellexist |
| | | | | | | | Validaterowcount |

FIG. 8B

```
1  ' If you need to change the default user id, password, exec path, exec name or url path for just this machine, then change it here.
2  Environment("harmony_defaultuser") = "admin"
3  Environment("harmony_defaultpassword") = "1234"
4  Environment("harmony_chain") = "JACKSON\aie"
5  Environment("harmony_exepath") = "C:\Program Files\Internet Explorer"
6  Environment("harmony_exename") = "iexplore.exe"
7  Environment("harmony_url") = "http://endeavw1008J-EC/upfw/"
8
9  'DB Details
10 Environment("DBServername") = "VIPXP-DIS"
11 Environment("DBuserid") = "sa"
12 Environment("DBpassword") = "qc"
13
```

FIG. 10

APPARATUSES, METHODS, AND COMPUTER PROGRAM PRODUCTS FOR CONDUCTING AUTOMATED TESTS

BACKGROUND

Organizations, such as healthcare providers, educational institutions, commercial enterprises, etc., often use computer applications to interface with their employees, customers, vendors, etc. in an effort to facilitate the receipt and provision of information. Such computer applications may, for example, generate user interfaces to receive input from a user, such as user log-in information (e.g., identifications and passwords), criteria for running queries, data for saving to the organization's system, etc., as well as to present information to the user, such as query results, result details, etc.

In order to ensure that an application will respond properly to a user's selections and inputs, the application's functionality is typically tested prior to distribution of the application to end users. The testing may be done by a human being who directly interacts with the user interface of the application to evaluate the performance of the application, or through automated testing, in which functional testing software may be used to simulate a user's interaction with the application and report on the results of such simulated interaction.

Accordingly, there is a need for techniques to facilitate the testing of applications to improve the performance of applications while reducing the cost, time, and effort required for developing, programming, and executing the various test scenarios.

BRIEF SUMMARY

Embodiments of the present invention address, among other things, the above need by providing improved apparatuses, methods, and computer program products for facilitating the automated testing of computer applications. In particular, embodiments of the present invention provide mechanisms for defining automated tests that are readable by automated testing software without requiring the automated testing scripts to be created by a programmer with knowledge of the particular scripting language used by the automated testing software. Rather, a test case template is provided in accordance with some embodiments, where the test case template is configured to receive input (e.g., from a test developer) in the form of keywords and selections that are not specified in a scripting language. Embodiments of the invention are configured to convert the completed test case template into an automated testing script (e.g., with reference to a keyword function library) that is readable by the automated testing software for execution of the automated test.

Accordingly, in some embodiments, an apparatus for conducting an automated test is provided, where the apparatus comprises at least one processor and at least one memory including computer program code. The at least one memory and the computer program code may be configured to, with the processor, cause the apparatus to at least generate a test case template by receiving a selection by a user of an object class to be tested from a list of predefined object classes and receiving a selection by the user of a test action from one or more test actions determined, via the processor, to be available based on the object class selected. The at least one memory and the computer program code may be configured to, with the processor, cause the apparatus to access a keyword function library including instructions for configuring an automated test using the test case template and to execute the automated test based on the instructions in the keyword function library.

In some cases, the at least one memory and the computer program code may be further configured to, with the processor, cause the apparatus to generate the test case template by receiving from the user an indication of an object name to be tested. Additionally or alternatively, the test case template may comprise a sequence of test steps, and the at least one memory and the computer program code may be further configured to, with the processor, cause the apparatus to generate each test step by receiving a selection by the user of an object class to be tested from a list of predefined object classes and receiving a selection by the user of a test action from one or more test actions determined, via the processor, to be available based on the object class selected. The at least one memory and the computer program code may be further configured to, with the processor, cause the apparatus to generate the test case template by receiving a selection by the user indicating whether to proceed to a subsequent test step in an instance in which the test action specified in a current test step fails.

In some embodiments, the at least one memory and the computer program code may be further configured to, with the processor, cause the apparatus to execute the automated test by accessing settings stored in a local environment variable file. Additionally or alternatively, the at least one memory and the computer program code may be further configured to, with the processor, cause the apparatus to generate a test execution report providing data regarding results of the automated test.

In other embodiments, a method and a computer program product are described that generate a test case template by receiving a selection by a user of an object class to be tested from a list of predefined object classes and receiving a selection by the user of a test action from one or more test actions determined to be available based on the object class selected. The method and computer program product may further access a keyword function library including instructions for configuring an automated test using the test case template and execute the automated test based on the instructions in the keyword function library.

In some cases, generating the test case template may further comprise receiving from the user an indication of an object name to be tested. The test case template may comprise a sequence of test steps, and each test step may be generated by receiving a selection by the user of an object class to be tested from a list of predefined object classes and receiving a selection by the user of a test action from one or more test actions determined, via the processor, to be available based on the object class selected. Generating the test case template may further comprise receiving a selection by the user indicating whether to proceed to a subsequent test step in an instance in which the test action specified in a current test step fails.

In some embodiments, the automated test may be executed in response to execution of a driver script entered by the user. Moreover, executing the automated test may comprise accessing settings stored in a local environment variable file. In some cases, a test execution report providing data regarding results of the automated test may be generated.

BRIEF DESCRIPTION OF THE SEVERAL VIEWS OF THE DRAWINGS

Figure 1:
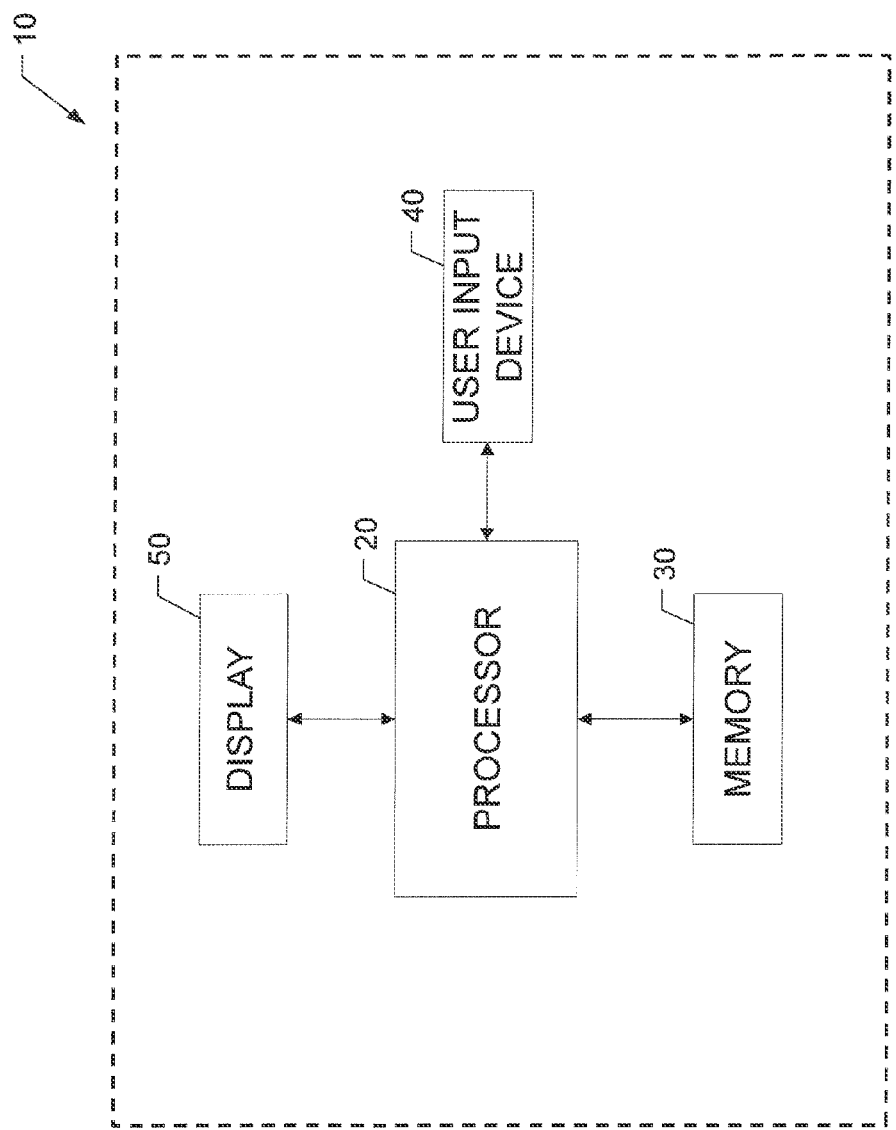
Figure 2:
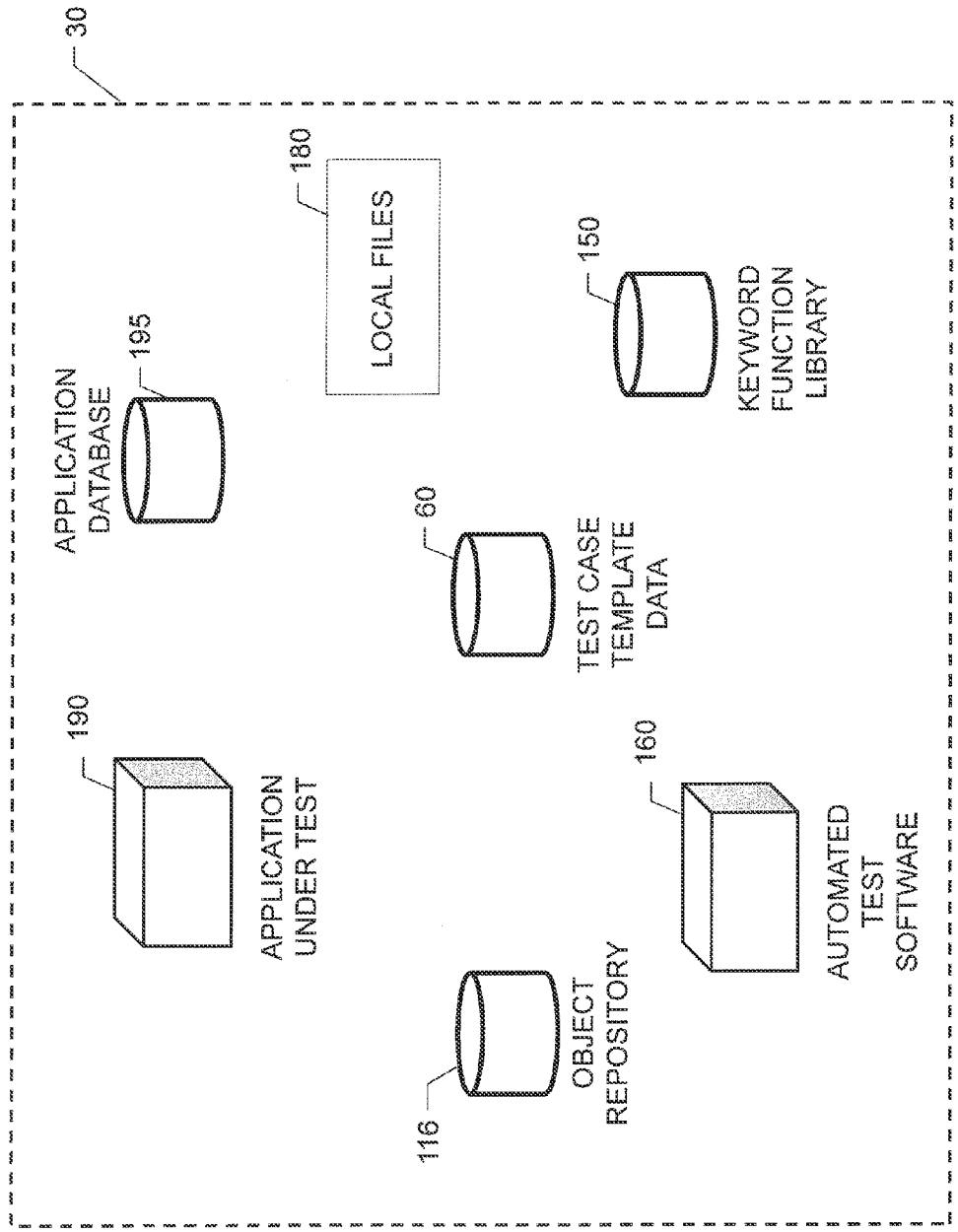
Figure 3:
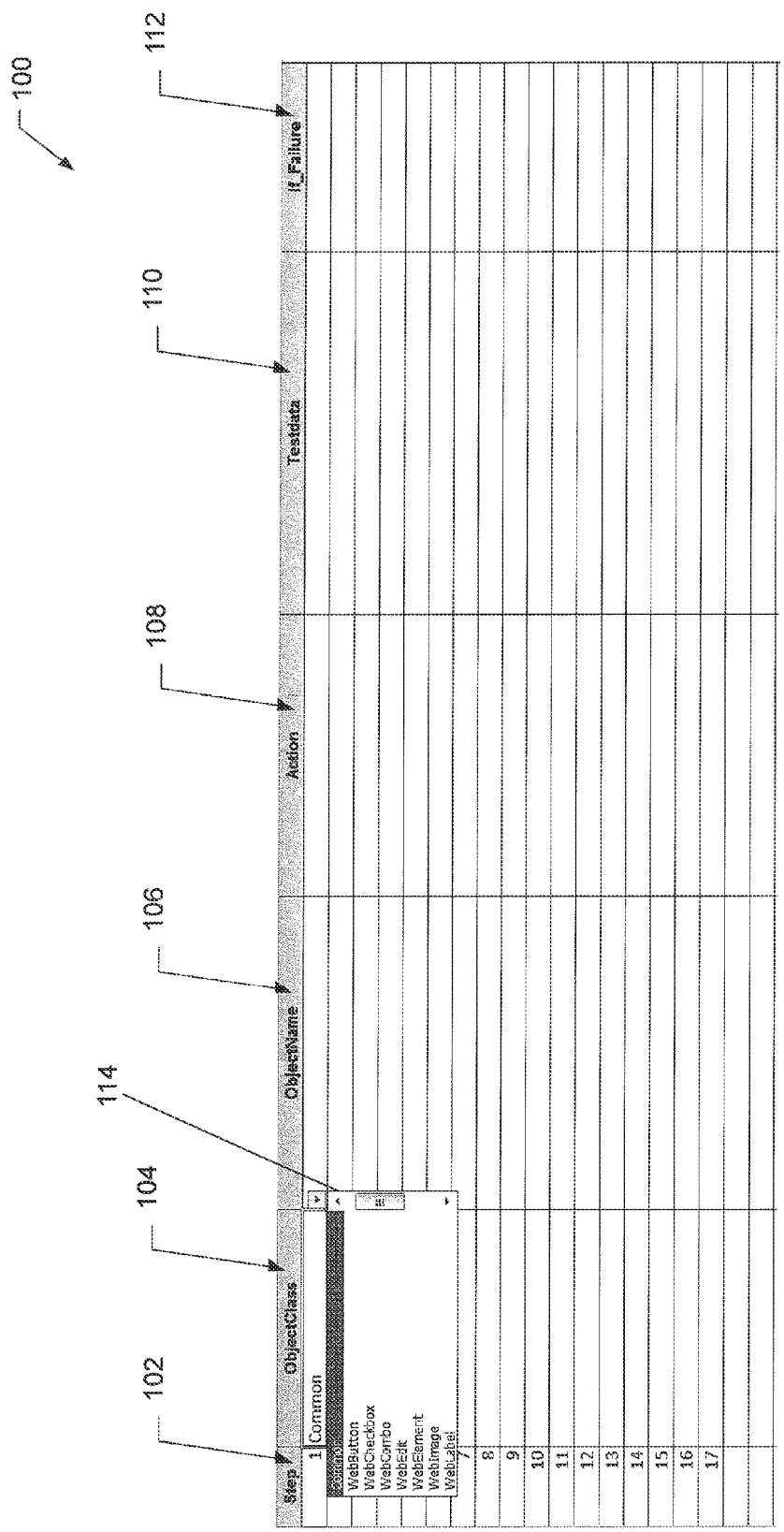
Figure 7A:
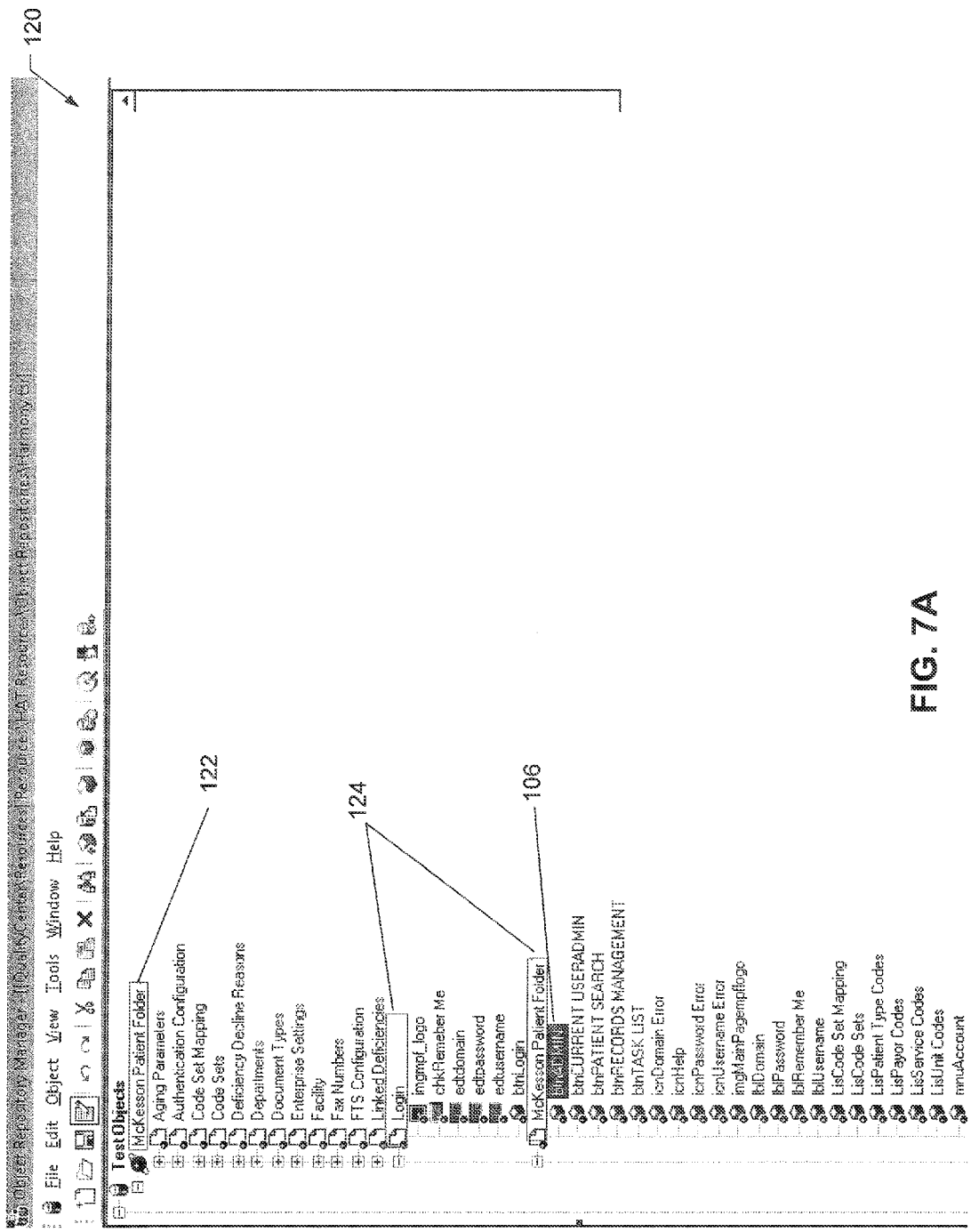
Figure 7B:
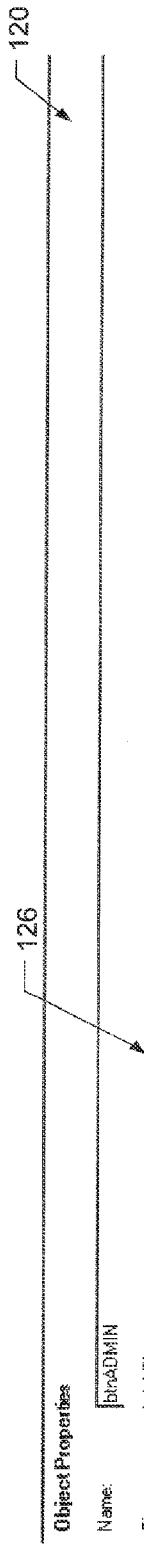
Figure 9:
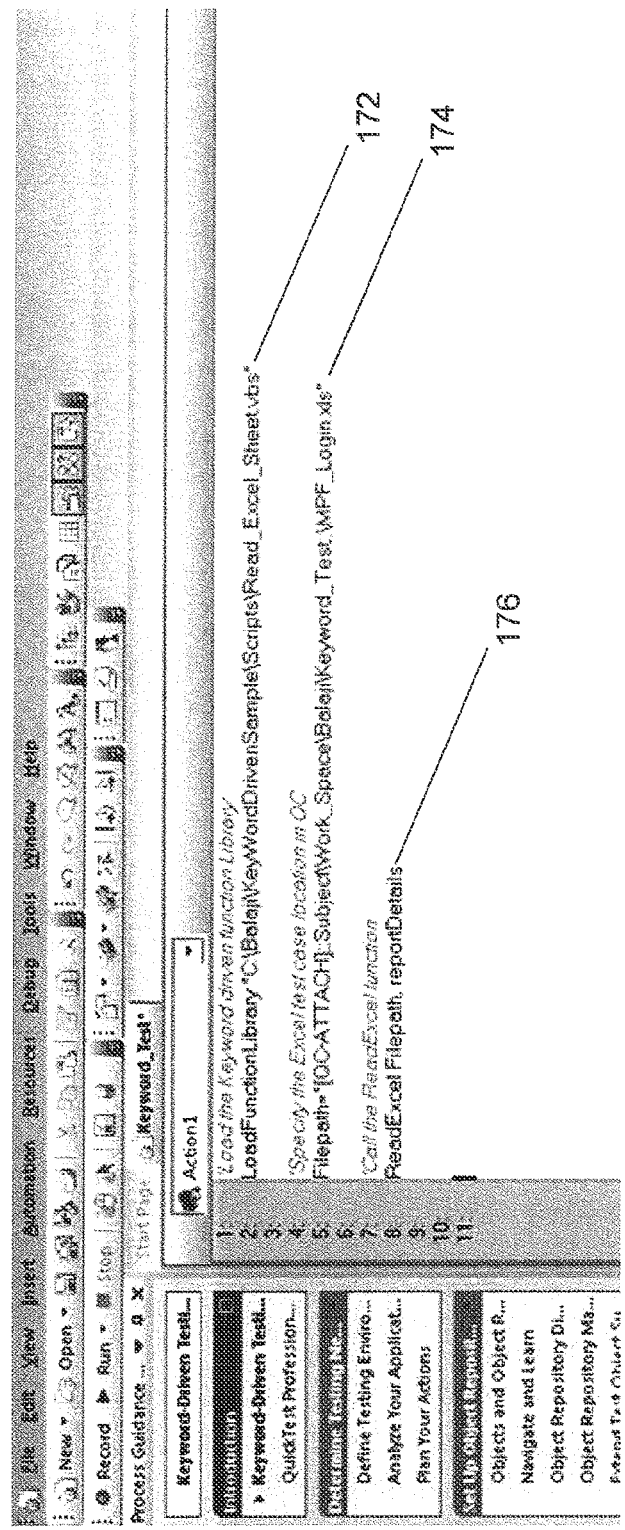
Figure 11:
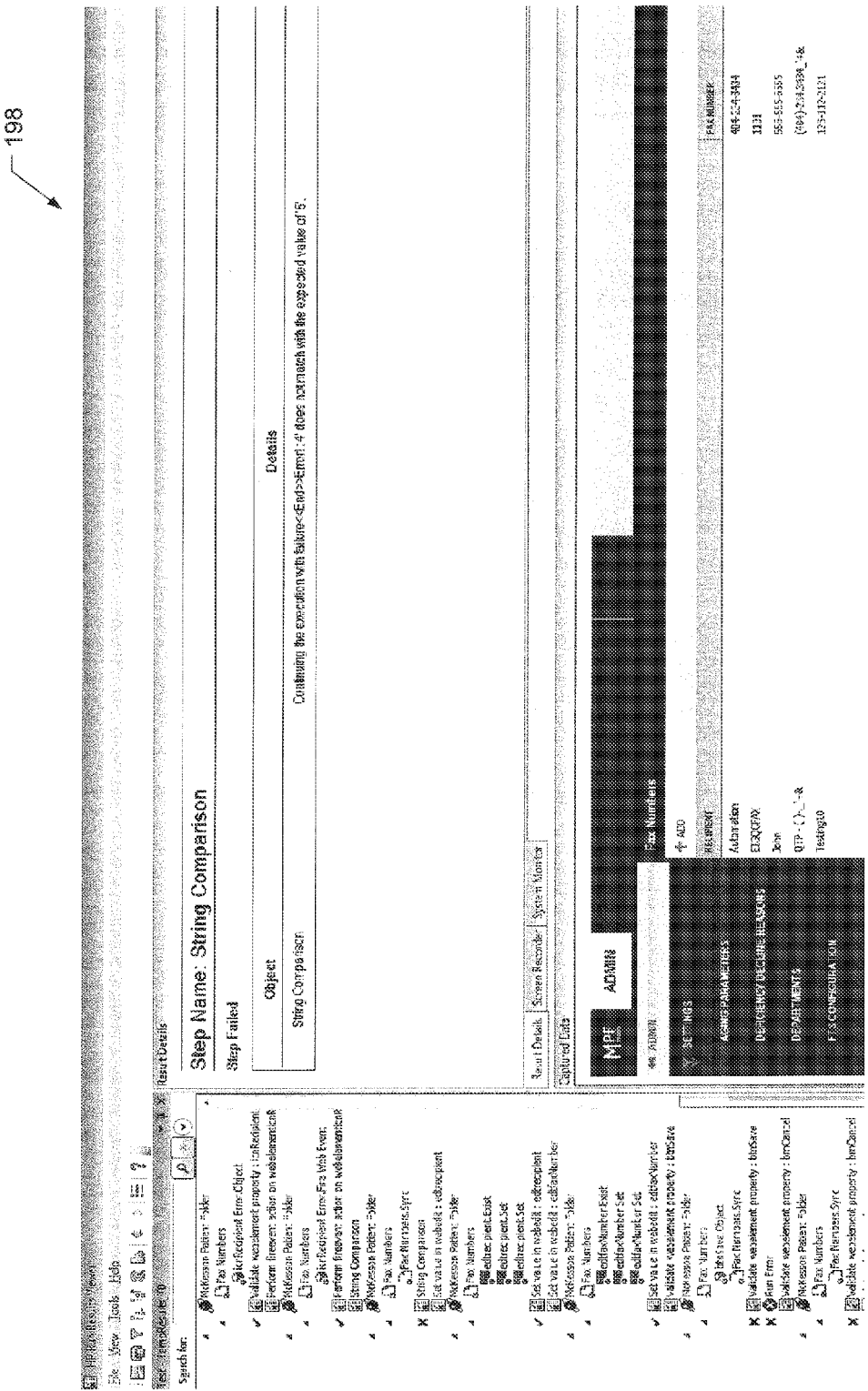
Figure 12:
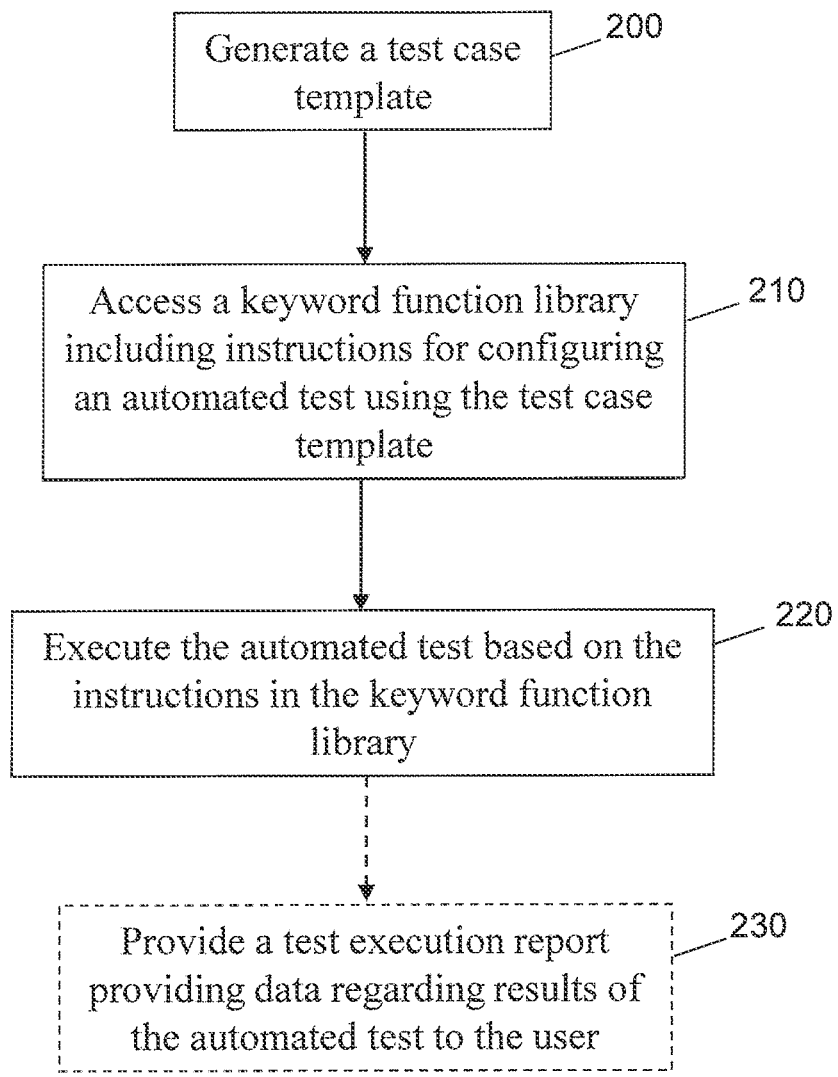

Having thus described example embodiments of the invention in general terms, reference will now be made to the accompanying drawings, which are not necessarily drawn to scale, and wherein:

FIG. 1 is a schematic representation of an apparatus in accordance with one example embodiment of the present invention;

FIG. 2 is a schematic representation of a memory of the apparatus of FIG. 1 in accordance with one example embodiment of the present invention;

FIGS. 3-6 illustrate a user interface for receiving user input to generate a test case template at various stages of completion in accordance with one example embodiment of the present invention;

FIGS. 7A and 7B illustrate a user interface for presenting data from an object repository in accordance with one example embodiment of the present invention;

FIGS. 8A and 8B illustrate data regarding available test actions for generating the test case template of FIGS. 3-6 in accordance with one example embodiment of the present invention;

FIG. 9 illustrates a driver script for initiating execution of the automated test in accordance with example embodiments of the present invention;

FIG. 10 illustrates a local file used in the execution of the automated test in accordance with example embodiments of the present invention;

FIG. 11 illustrates a test execution report for reporting results of the automated test in accordance with example embodiments of the present invention; and FIG. 12 is a flow chart illustrating a method of conducting automated tests according to an example embodiment of the present invention.

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

Although the description that follows may include examples in which embodiments of the invention are used in the context of healthcare organizations, such as hospitals, it is understood that embodiments of the invention may be applied to applications used in numerous settings, including in other types of healthcare organizations and in organizations outside the field of healthcare. Moreover, embodiments of the invention may be used for the automated testing of applications used by individual users outside the context of an organization, such as for personal or residential use.

In general, a computer application is a software program (e.g., executable software consisting of compiled code that can run directly from a computer's operating system) that provides a specific group of functions to the user. For example, a word processing application is a software program that is designed with functionality that allows a user to create a written document. As another example, an email application is a software program that is designed with functionality that allows a user to receive, read, and store emails, reply to received emails, and draft and send new emails. In the context of an organization, such as a healthcare organization (e.g., a hospital, pharmacy, clinic, etc.), an educational institution (e.g., a university), or a business (e.g., a corporation), for example, applications may be used to enable or facilitate the daily work activities of members of the organization. In a hospital setting, for example, an application may be used by the medical staff (doctors, nurses, technicians, pharmacists, etc.) to access patient medical histories, enter orders for medications to be administered to the patients, record the time, dosage, etc. of medication administered to a patient, schedule appointments, record insurance and billing information, enter notes, etc.

As with any software, an application may include errors, or bugs, that may cause it to behave in an unintended manner. For example, a button presented on a user interface of the application that is selectable by a user may not respond when the user clicks on it, or selection of a particular option presented on the user interface may cause the application to freeze or quit unexpectedly.

To avoid such unexpected problems and maximize the performance of the application, the functionality of an application is typically tested prior to the distribution of the application to the intended end users. To expedite the testing process, such testing is often automated through the use of functional testing software that simulates a user's interaction with the application and provides results of the simulated interactions. HP Unified Functional Testing software, formerly known as QuickTest Professional (QTP), from Hewlett Packard, is one example of automated testing software that may be used to conduct automated tests. Automated testing software that is used to test user interface functionality may be designed to conduct the testing by identifying the objects in the application user interface or a web page, perform desired actions (e.g., a mouse click or keyboard entry), capture object properties, etc.

Most, if not all, automated testing software uses scripting language to specify the test procedure and manipulate the objects and controls of the application under test. A script, or list of commands that are executable by the automated testing software, may, for example, be written using DOS (Disk Operating System), VB (Visual Basic), AppleScript, ASP (Active Server Pages), JSP (JavaServer Pages), or other scripting languages, depending on the automated testing software used.

Thus, to create an automated testing script in conventional scenarios, the test developer (e.g., a quality assurance engineer) was required to have knowledge of the particular scripting language used by the automated testing software. In the case of QTP, for example, the test developer in a conventional scenario can only create the automated testing scripts if he or she has VB programming skills. In addition to requiring test developers to have specialized programming knowledge, in conventional scenarios, the automated testing script itself may have errors and may need to be debugged, which makes creating a working script more difficult and time-consuming.

Accordingly, methods, apparatuses, and computer program products are provided that can create automated testing scripts in the scripting language that is readable by the particular automated testing software being used, but without requiring the test developer (hereinafter called "the user") to have competency in programming using that scripting language. Rather, a test case template is generated that guides the user in the formulation of a testing scenario by receiving the user's keyword inputs and selections of predefined options into the test case template, and then providing instructions to the automated testing software to allow the automated testing software to be able to read and understand the test case template such as through access to a keyword functional library and/or a shared object repository. In this way, the user need not have specific knowledge of the automated testing scripting language, which will allow more users to create the test scenarios. As a result, the time and costs involved in automated testing may be reduced, leading to more thorough and effective testing of applications.

With reference now to FIG. 1, an apparatus 10 is illustrated for conducting an automated test. The apparatus 10 may, in some embodiments, be a computer (e.g., a desktop computer, laptop computer, server, etc.) or other user device that includes hardware and software configured for receiving user input, generating a test case template based on the user input, and converting the test case template into a script that is readable by automated test software, such that an automated test of an application may be conducted, as described in greater detail below. In other embodiments, the apparatus 10 may be embodied as a chip or chip set. In other words, the apparatus 10 may comprise one or more physical packages (e.g., chips) including materials, components and/or wires on a structural assembly (e.g., a baseboard). The apparatus 10 may therefore, in some cases, be configured to implement an embodiment of the present invention on a single chip or as a single "system on a chip."

In some embodiments, the apparatus 10 may comprise at least one processor 20, which may be embodied in a number of different ways. For example, the processor 20 may be a coprocessor, a microprocessor, a controller, or various other processing circuitry including integrated circuits. In some embodiments, the processor 20 may include one or more processing cores configured to perform independently. Additionally or alternatively, the processor 20 may include one or more processors configured in tandem via a bus to enable independent execution of instructions, pipelining and/or multithreading.

The apparatus 10 may further comprise at least one memory 30, and the processor 20 may be configured to execute instructions stored in the memory 30 or that are otherwise accessible to the processor. In embodiments in which the processor is embodied as an executor of software instructions, the instructions may specifically configure the processor to perform the algorithms and/or operations described herein when the instructions are executed. The memory 30, which may include volatile memory, such as volatile Random Access Memory (RAM) and/or non-volatile memory, may store any of a number of pieces of information and data, including software programs, libraries, databases, applications, repositories of data, files, etc. that are used by the apparatus 10 to implement the functions described herein. A memory 30 storing various types of data according to one embodiment is illustrated in FIG. 2 and described in greater detail below.

With continued reference to FIG. 1, the apparatus 10 may further include or be in communication with a user input device 40 and a display 50. The user input device 40 may be one or more of a keyboard, mouse, touchpad, touchscreen, etc., that is configured to receive input from a user and convey the input to the processor 20. The display 50 may be any computer output surface and/or projecting mechanism that is configured to show text and/or graphic images to the user, such as via cathode ray tube (CRT), liquid crystal display (LCD), light-emitting diode, gas plasma, or other image projection technology.

As described above, an apparatus 10 (shown in FIG. 1) for conducting an automated test is provided in accordance with embodiments of the present invention, in which the apparatus comprises at least one processor 20 and at least one memory 30 including computer program code. The at least one memory and the computer program code may be configured to, with the processor, cause the apparatus to generate a test case template by receiving a selection by the user of an object class to be tested from a list of predefined object classes and receiving a selection by the user of a test action from one or more test actions determined to be available based on the object class selected.

In this regard, according to embodiments of the invention described herein, a user interface may be presented on the display 50 for receiving input from the user (e.g., via the user input device 40), where the input is used to generate a test case template. As shown in FIG. 2, for example, test case template data 60, which may be stored in the memory 30, may be used (e.g., by the processor 20 of FIG. 1) to create a user interface 100, such as shown in FIGS. 3-6. The user interface 100 may be configured in the form of a table with rows representing each step 102 of the test to be executed and columns specifying details of each step of the test to be conducted in keyword format (e.g., as opposed to scripting language, such as VB). The details may include, for example, the object class 104 and object name 106 of the object to be acted upon, the action 108 to be taken, any test data 110 that must be obtained (e.g., criteria to be satisfied) when the action is taken on the specified object, and an indication 112 of how to proceed in the event the step fails (e.g., if the action 108 fails or the criteria specified under test data 110 is not met). Furthermore, predefined data stored, for example, in the test case template data 60 that is used to generate the test case template and solicit user input as described below (e.g., data used for providing the various drop down menus) may be defined and updated by an administrator of the apparatus and the associated software.

In some embodiments, the object class 104 may be specified by the user via a drop down menu 114 that lists the available object classes from which the user may make a selection. In the example depicted in FIG. 3, the user has selected an object class of "Common." Other object classes may include, for example, "Browser_Page," "WebButton," "WebCheckbox," "WebCombo," "WebEdit," "WebElement," "WebImage," "WebLabel," "WebLink," "WebList," "WebMenu," "WebRadio," "WebTable," and so on. The object classes 104 provided in the drop down menu 114 may be predefined in the test case template data 60 (FIG. 2) and may depend on the particular type of application to be tested.

Depending on the predefined object class 104 that is selected, the user may need to provide user input specifying the object name 106 for the object to be acted upon in the given step of the test. For example, although the object class 104 of "Common" may not have any associated object names 106 to be specified, in Step 2 of the test (shown in FIG. 6) the user may select a predefined object class 104 of "Browser_Page." In this case, the user may need to specify an object name 106 within the object class 104 "Browser_Page" to indicate which object is to be acted upon. The user may, in this case, refer to data in an object repository 116 (shown in FIG. 2) to determine the object name 106 for the desired object to be acted upon. In this regard, the object repository 116 may be a database of information that, e.g., is stored in the memory 30 of the apparatus 10 of FIG. 1.

Turning to FIGS. 7A and 7B, data stored in the object repository 116 of FIG. 2 may be presented to the user via another user interface 120. In FIGS. 7A and 7B, only a portion of the data stored in the object repository 116 is shown for explanatory purposes. The user interface 120 may, for example, present information regarding the browser name 122 for the application under test, the page names 124 for each page under the browser, and the object name 106 of the objects that can be acted upon under each page, as shown in FIG. 7A. In another area of the user interface 120, shown in FIG. 7B, object properties and details 126 for a selected object name 106 (FIG. 7A) may be presented to give the user additional context and facilitate the user's selection of an object name. Thus, with reference to the user interface 120 presenting data from the object repository 116, the user may determine which object name 106 to enter in the corresponding location in the user interface 100 of FIGS. 3-6. Object names 106 may include, for example, "btnADMIN," "tblAdmin Tree View," "titFax Numbers," "tblFax Numbers," "btnAdd," "btnSave," "edtrecipient," "edtfaxNumber," etc.

Figure 4:
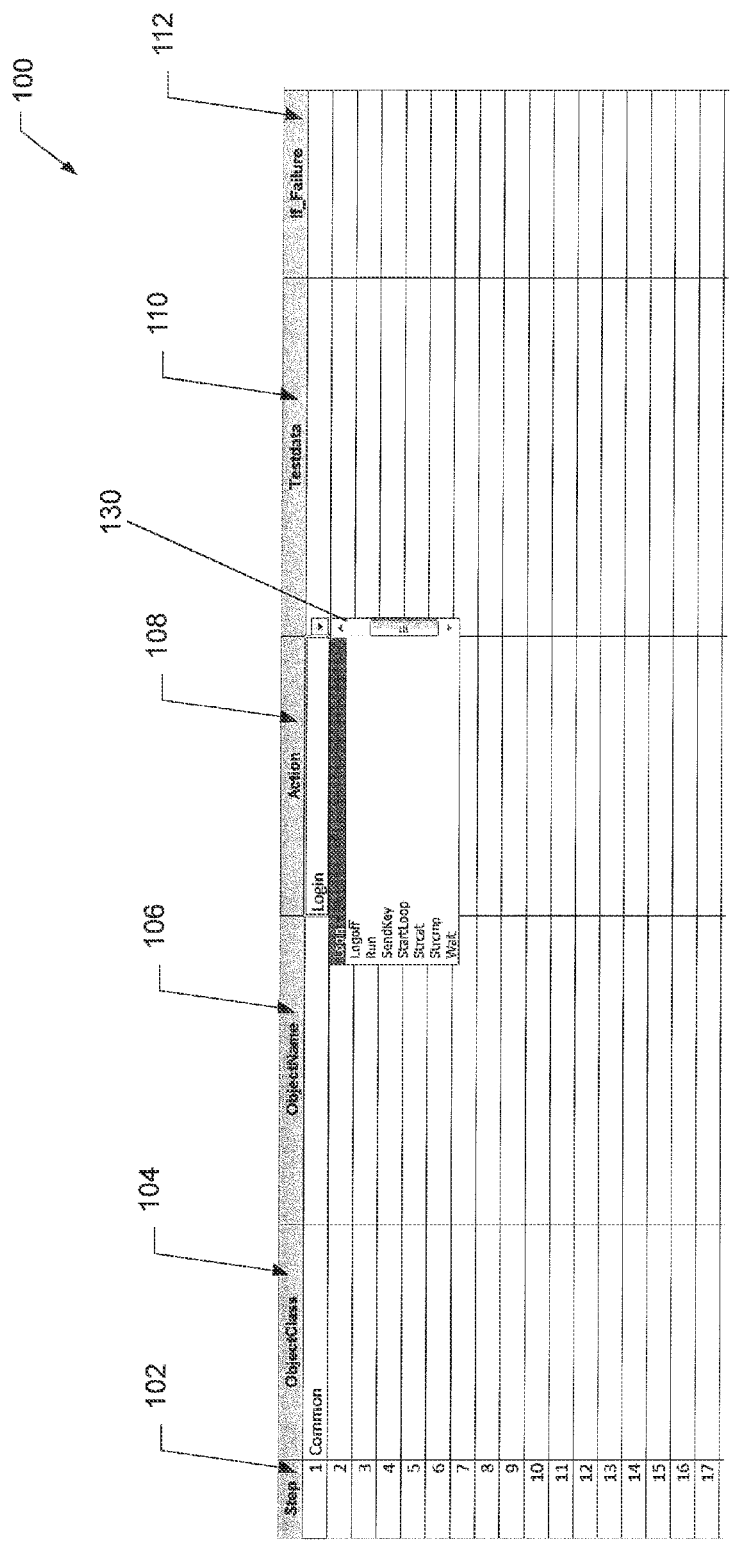

With reference to FIG. 4, an available test action 108 may be determined by the apparatus (e.g., via the processor) based on the object class 104 that is selected. The available test actions 108 that are determined may, for example, be presented to the user via a drop down menu 130, from which the user is able to select one test action. In FIG. 4, for example, the user selected the test action "Login" from available test actions including "Login," "Logoff," "Run," "SendKey," "StartLoop," "Strcat," "Strcmp," and "Wait." In other steps of the test, where other object classes 104 are selected, other available test actions 108 may be presented via the drop down menu 130, as shown by the user's selections in the completed test case template depicted in FIG. 6. Test case template data 60 (shown in FIG. 2) may thus include data 132 (illustrated in tabular form in FIGS. 8A and 8B) that lists the available test actions 108 for each object class 104, which may in turn be used to provide the drop down menus 130 in the user interface 100 of FIGS. 3-6. In some embodiments, for example, the table illustrated in FIGS. 8A and 8B may be provided and associated with the test case template form of FIGS. 3-6. For instance, in embodiments in which the test case template is provided to the user via a user interface 100 that is an Excel spreadsheet, the user interface 100 of FIGS. 3-6 may form one tab of the spreadsheet presented to the user, whereas the table of data 132 shown in FIGS. 8A and 8B may form another tab of the same spreadsheet.

In some cases, depending on the object to be acted on, the user may need to specify test data 110 for one or more of the steps of the test. Test data 110 may be entered, for example, for steps in which the action 108 to be taken on a particular object requires additional information to be completed. For example, if the action 108 involves a database query, the test data 110 may specify where to find the information to be queried. As another example, if the action 108 is to determine whether the object is in a particular state (e.g., whether a web element exists), the test data 110 may specify the criteria to be satisfied (e.g., that the specified state should be "true"). FIG. 6 provides examples of designations that may be received from the user of certain test data 110 to be satisfied by the test action 108 for certain object classes 104. Test data 110 may include, for example, "Fax Numbers," "TRUE," "select max (faxes_seq)+1 from cabinet..FAXES," "Testing,Row$10," "Testing,Row$10," "Row$11," "123-112-2121," "Row$7,1," and so on. In some embodiments, a designation of no test data 110 may be received (e.g., when the user leaves the cell blank), indicating that the action 108 to be performed on the specified object requires no additional data or criteria.

Figure 5:
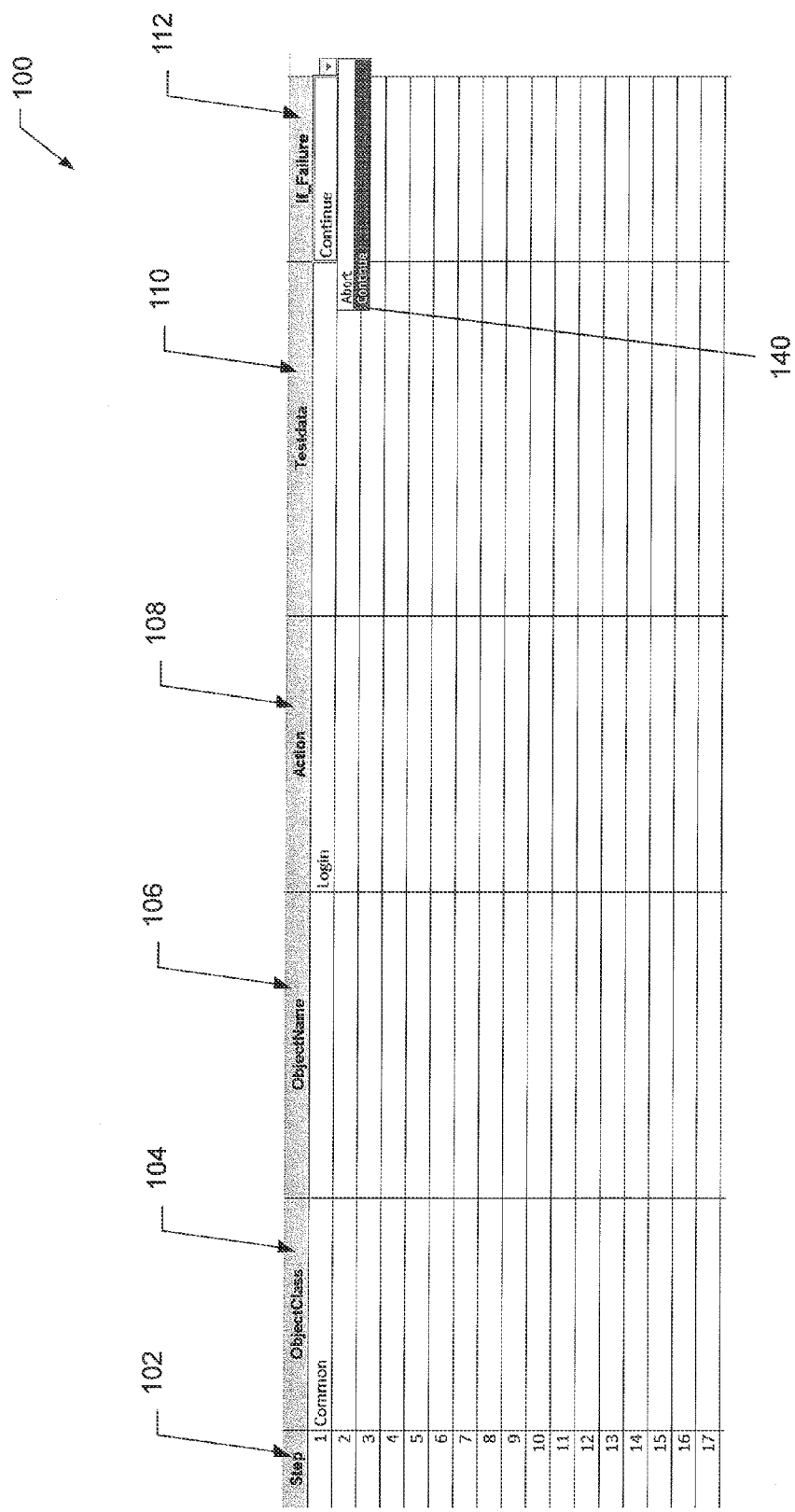

With reference to FIGS. 5 and 6, the test case template that is generated by the receipt of user input via the user interface 100 as described above may comprise a sequence of test steps 102. Accordingly, in some cases, a selection of an indication 112 by the user may be received that indicates whether to proceed to a subsequent test step in an instance in which the test action 108 specified in the current test step fails. The indication 112 may, for example, be to "abort" the test (e.g., to end the test without proceeding to the next step 102 of the test) or to "continue" with the test (e.g., to proceed to the next step despite the failure of the action 108). The available indications 112 may be presented for selection by the user via a drop down menu 140, in some embodiments, as shown in FIG. 5. In other embodiments, however, data provided for selection by the user via drop down menus 114, 130, 140 in FIGS. 3-6 may be entered by the user in various other ways, such as via radio buttons, free form text entry, etc. Moreover, in some cases, the indication 112 of whether to proceed may be left blank by the user, such as for steps 102 that specify test actions 108 that are not associated with a failure condition (e.g., a "Rowcount" action).

Once a test case template has been generated, such as by receiving input from the user via the user interface 100 of FIGS. 3-6 as described above, the test case template may be used to create an automated testing script that can be used by the automated testing software to carry out the automated test. In this regard, the at least one memory and the computer program code may be configured to, with the processor, cause the apparatus to access a keyword function library 150 stored in the memory 30 of the apparatus (shown in FIG. 2). The keyword function library 150 may include instructions for configuring an automated test. Thus, in some embodiments, the at least one memory and the computer program code may be configured to, with the processor, cause the apparatus to convert the test case template into automated testing script readable by the automated testing software 160 (shown in FIG. 2) based on the instructions in the keyword function library 150.

In some embodiments, for example, the keyword function library 150 may include data (e.g., in sub-libraries) that describes to the automated testing software 160 how to read the test case template, such that the test case template is understood as though it were written in the scripting language that is used by the automated testing software 160. For example, the keyword function library 150 may include code readable by the automated testing software 160 that describes what the object class 104 and test action 108 inputted by the user into the test case template via the user interface 100 in FIG. 6 mean and how the specified test action may be executed on the specified object class. In this way, the instructions defined in the keyword function library 150 may be considered a link between the test case template provided in keyword format by the user and the automated testing script expected by the automated test software 160 for executing the automated test.

In some embodiments, the automated test may be executed in response to the execution of a driver script that is entered by the user, such as via a user interface 170 shown in FIG. 9. The driver script may require only minimal knowledge by the user of scripting language that is understood by the automated test software. For example, as illustrated in FIG. 9, the driver script may have only three lines of code that specify to the automated test software where the keyword function library resides (e.g., in the first line of the script 172), where the completed test case template is stored (e.g., in the second line of the script 174), and instructions to execute the test (e.g., in the third line of script 176).

With reference again to FIG. 2, in some cases, the instructions in the keyword function library 150 may instruct the automated test software 160 to access other sources as part of reading the test case template and executing the automated test. For example, the automated test software 160 may be instructed to access the object repository 116 to obtain information regarding the object in each step of the test to be acted upon. In still other embodiments, the instructions may instruct the automated test software 160 to access settings stored in one or more local files 180, such as a local environment variable file, for executing the automated test. The local environment variable file or other local files may, for example, include information for configuring settings that may be required for execution of the test, such as login information for the application under test 190, the Uniform Resource Locator (URL) of the application under test, the location of any application databases 195 associated with the application under test, etc. An example of a local file 180, such as a local environment variable file, is shown in FIG. 10.

In this regard, although the application under test 190 and the application database 195 are shown in FIG. 2 as residing in the memory 30 of the apparatus 10 of FIG. 1, the application under test 190 and/or the application database 195 may reside in different parts of the memory 30 or in memories of other sources (e.g., the memory of a server or other memory) that are accessible to the apparatus 10. Likewise, the local files 180, automated test software 160, keyword function library 150, object repository 116, test case template data 60, and any other data may be stored on the memory 30 as shown in FIG. 2, or one or more of these may be stored in memories of other sources (e.g., the memory of a server or other memory) accessible to the apparatus 10.

Upon execution of the automated test as described above, in some embodiments the at least one memory and the computer program code may be configured to, with the processor, cause the apparatus to generate a test execution report providing data regarding results of the automated test. An example of a test execution report 198 is shown in FIG. 11. In some cases, for example, the test execution report 198 may include a description for each step of the test of start and end point information. In the event that a particular step of the test fails, an error description may be provided to aid the user in determining the cause of failure and the appropriate remedy. Furthermore, in some embodiments, a screenshot of the application user interface may be provided showing where the automated test failed, to further aid the user in finding a resolution.

Referring now to FIG. 12, embodiments of a method of conducting automated tests are provided. According to embodiments of the method, a test case template may be generated at Block 200. The test case template may be generated as described above by receiving a selection by the user of an object class to be tested from a list of predefined object classes and receiving selection of a test action from one or more test actions determined to be available based on the object class selected. A keyword function library may be accessed including instructions for configuring an automated test using the test case template at Block 210, and the automated test may be executed based on the instructions in the keyword function library at Block 220.

In some embodiments, the test case template may comprise a sequence of test steps, and each test step may be generated by receiving a selection by the user of an object class to be tested from a list of predefined object classes and receiving selection of a test action from one or more test actions determined to be available based on the object class selected. In some cases, generating the test case template may include receiving from the user an indication of an object name to be tested. Generating the test case template may, in some cases, comprise receiving a selection by the user indicating whether to proceed to a subsequent test step in an instance in which the test action specified in a current test step fails.

As described above, the automated test may be executed in response to execution of a driver script entered by the user. Moreover, executing the automated test may comprise accessing settings stored in a local environment variable file or other local file. In some embodiments, a test execution report providing data regarding results of the automated test may be provided to the user at Block 230.

Example embodiments of the present invention have been described above with reference to block diagrams and flowchart illustrations of methods, apparatuses, and computer program products. In some embodiments, certain ones of the operations above may be modified or further amplified as described below. Furthermore, in some embodiments, additional optional operations may be included, some examples of which are shown in dashed lines in FIG. 12. Modifications, additions, or amplifications to the operations above may be performed in any order and in any combination.

It will be understood that each operation, action, step and/or other types of functions shown in the diagram (FIG. 12), and/or combinations of functions in the diagram, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein.

For example, program code instructions associated with FIG. 12 may be stored on one or more storage devices, such as a memory 30 of the apparatus 10, and executed by one or more processors, such as processor 20, shown in FIG. 1. Additionally or alternatively, one or more of the program code instructions discussed herein may be stored and/or performed by distributed components, such as those discussed in connection with the apparatus 10. As will be appreciated, any such program code instructions may be loaded onto computers, processors, other programmable apparatuses or network thereof from one or more computer-readable storage mediums to produce a particular machine, such that the particular machine becomes a means for implementing the functions of the actions discussed in connection with, e.g., FIG. 12 and/or the other drawings discussed herein. As such, FIG. 12 showing data flows may likewise represent program code instructions that may be loaded onto a computer, processor, other programmable apparatus or network thereof to produce a particular machine.

The program code instructions stored on the programmable apparatus may also be stored in a non-transitory computer-readable storage medium that can direct a computer, a processor (such as processor 20) and/or other programmable apparatus to function in a particular manner to thereby generate a particular article of manufacture. The article of manufacture becomes a means for implementing the functions of the actions discussed in connection with, e.g., FIG. 12. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., the process illustrated in FIG. 12.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of conducting an automated test comprising:
generating, via a processor, a test case template by:
receiving a selection by a user of an object class to be tested from a list of predefined object classes; and
receiving a selection by the user of a test action from one or more test actions determined, via the processor, to be available based on the object class selected;
accessing a keyword function library including instructions for configuring an automated test using the test case template; and
executing the automated test based on the instructions in the keyword function library.

2. The method of claim 1, wherein generating the test case template further comprises receiving from the user an indication of an object name to be tested.

3. The method of claim 1, wherein the test case template comprises a sequence of test steps, wherein each test step is generated by:
receiving a selection by the user of an object class to be tested from a list of predefined object classes; and
receiving a selection by the user of a test action from one or more test actions determined, via the processor, to be available based on the object class selected.

4. The method of claim 3, wherein generating the test case template further comprises receiving a selection by the user indicating whether to proceed to a subsequent test step in an instance in which the test action specified in a current test step fails.

5. The method of claim 1, wherein the automated test is executed in response to execution of a driver script entered by the user.

6. The method of claim 1, wherein executing the automated test comprises accessing settings stored in a local environment variable file.

7. The method of claim 1 further comprising generating a test execution report providing data regarding results of the automated test.

8. An apparatus for conducting an automated test comprising, the apparatus comprising at least one processor and at least one memory including computer program code, the at least one memory and the computer program code configured to, with the processor, cause the apparatus to at least:
generate a test case template by:
receiving a selection by a user of an object class to be tested from a list of predefined object classes; and
receiving a selection by the user of a test action from one or more test actions determined, via the processor, to be available based on the object class selected;
access a keyword function library including instructions for configuring an automated test using the test case template; and
execute the automated test based on the instruction in the keyword function library.

9. The apparatus of claim 8, wherein the at least one memory and the computer program code are further configured to, with the processor, cause the apparatus to generate the test case template by receiving from the user an indication of an object name to be tested.

10. The apparatus of claim 8, wherein the test case template comprises a sequence of test steps, wherein the at least one memory and the computer program code are further configured to, with the processor, cause the apparatus to generate each test step by:
receiving a selection by the user of an object class to be tested from a list of predefined object classes; and
receiving a selection by the user of a test action from one or more test actions determined, via the processor, to be available based on the object class selected.

11. The apparatus of claim 10, wherein the at least one memory and the computer program code are further configured to, with the processor, cause the apparatus to generate the test case template by receiving a selection by the user indicating whether to proceed to a subsequent test step in an instance in which the test action specified in a current test step fails.

12. The apparatus of claim 8, wherein the at least one memory and the computer program code are further configured to, with the processor, cause the apparatus to execute the automated test by accessing settings stored in a local environment variable file.

13. The apparatus of claim 8, wherein the at least one memory and the computer program code are further configured to, with the processor, cause the apparatus to generate a test execution report providing data regarding results of the automated test.

14. A computer program product comprising at least one non-transitory computer-readable storage medium having computer-executable program code portions stored therein, the computer-executable program code portions comprising program code instructions for:
generating a test case template by:
receiving a selection by a user of an object class to be tested from a list of predefined object classes; and
receiving a selection by the user of a test action from one or more test actions determined to be available based on the object class selected;
accessing a keyword function library including instructions for configuring an automated test using the test case template; and
executing the automated test based on the instructions in the keyword function library.

15. The computer program product of claim 14, wherein the program code portions for generating the test case template further comprise program code instructions configured for receiving from a user an indication of an object name to be tested.

16. The computer program product of claim 14, wherein the test case template comprises a sequence of test steps, wherein the program code portions for generating each test step further comprise program code instructions configured for:
receiving a selection by the user of an object class to be tested from a list of predefined object classes; and
receiving a selection by the user of a test action from one or more test actions determined to be available based on the object class selected.

17. The computer program product of claim 16, wherein the program code portions for generating the test case template further comprise program code instructions configured for receiving a selection by the user indicating whether to proceed to a subsequent test step in an instance in which the test action specified in a current test step fails.

18. The computer program product of claim 14, wherein the program code portions for executing the automated test further comprise program code instructions configured for executing the automated test in response to execution of a driver script entered by the user.

19. The computer program product of claim 14, wherein the program code portions for executing the automated test further comprise program code instructions configured for accessing settings stored in a local environment variable file.

20. The computer program product of claim 14, wherein the program code portions further comprise program code instructions configured for generating a test execution report providing data regarding results of the automated test.

\* \* \* \* \*